United States Patent [19]

Huan

[11] Patent Number: 5,745,903
[45] Date of Patent: Apr. 28, 1998

[54] METHOD AND APPARATUS FOR FILE CHANGE NOTIFICATION

[75] Inventor: Fang-Fei S. Huan, Marlboro, N.J.

[73] Assignee: NCR Corporation, Dayton, Ohio

[21] Appl. No.: 540,231

[22] Filed: Oct. 6, 1995

[51] Int. Cl.$^6$ .................................................. G06F 17/30
[52] U.S. Cl. ........................ 707/201; 707/203; 707/205
[58] Field of Search ............................ 395/619; 707/201, 707/203, 205

[56] References Cited

U.S. PATENT DOCUMENTS

| | | | |
|---|---|---|---|
| 4,558,413 | 12/1985 | Schmidt et al. | 395/619 |
| 4,809,170 | 2/1989 | Beblang et al. | 395/703 |
| 4,853,843 | 8/1989 | Ecklund | 395/619 |
| 5,047,918 | 9/1991 | Schwartz et al. | 395/619 |
| 5,327,556 | 7/1994 | Mohan et al. | 395/608 |
| 5,619,700 | 4/1997 | Abe | 295/703 |
| 5,634,124 | 5/1997 | Khoyi et al. | 395/614 |
| 5,666,532 | 9/1997 | Saks et al. | 395/621 |

*Primary Examiner*—Wayne Amsbury
*Attorney, Agent, or Firm*—Matthew J. Hodulik

[57] ABSTRACT

A file change notification method and apparatus is disclosed which is efficient, simple and reliable. The invention utilizes a system call to notify a kernel of file modification events on files of interest. Upon occurrence of any file modification event, a signal is transmitted by a kernel to notify a calling process that such an event occurred. The invention further utilizes the system call to retrieve names of modified files of interest. The names are retrieved and stored in a predetermined buffer. Additionally, the present invention indicates whether each name of the modified files of interest has been retrieve by specifying a predetermined flag value.

20 Claims, 4 Drawing Sheets

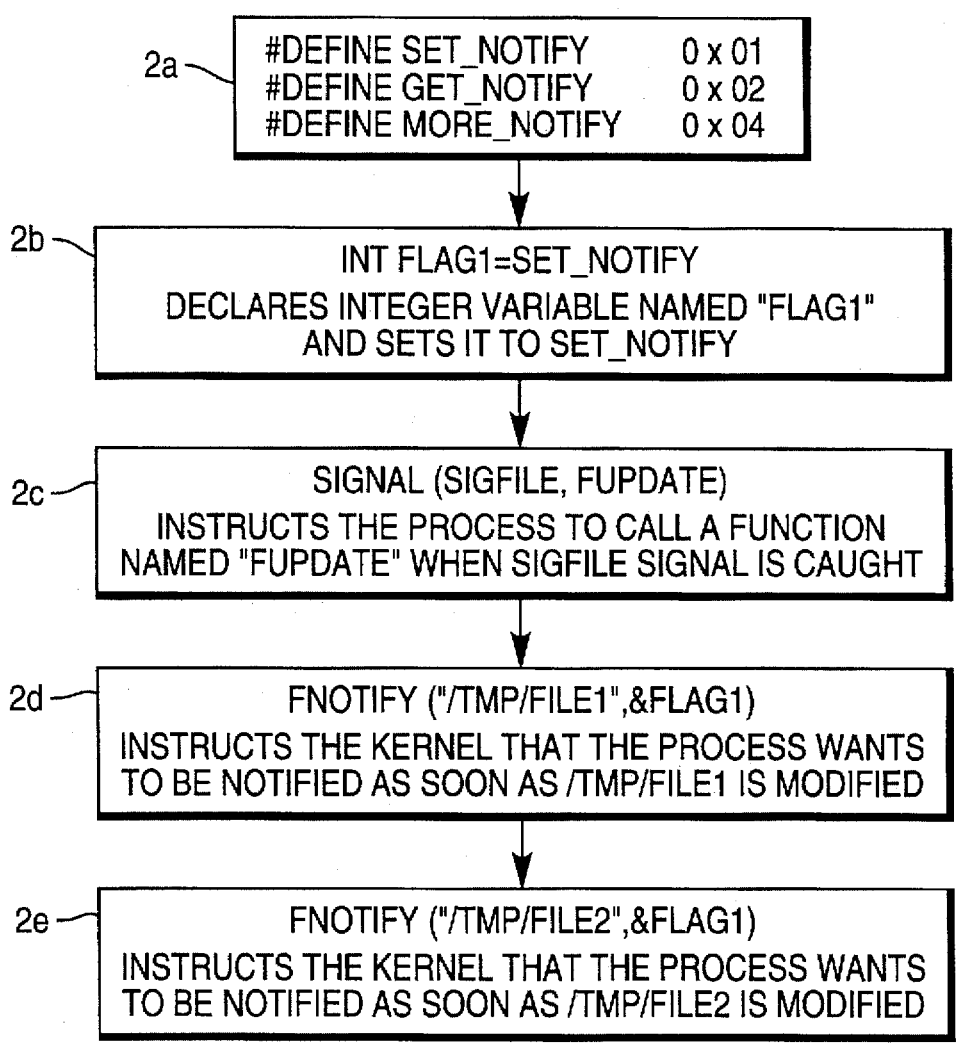

1

METHOD AND APPARATUS FOR FILE CHANGE NOTIFICATION

BACKGROUND OF THE INVENTION

1. Field of the Invention

This invention relates to the field of computer systems, and more particularly to a method and apparatus adapted to perform file change notifications in an efficient and reliable manner.

2. Background

Computer operating systems provide, among other services, access to files stored within a computer system. A process in the computer system which needs to make reference to data in a file will open, read and store the file as cached data to improve process performance. However, in a multi-user, multi-process environment, the same file can be updated by another process at any time. Thus, there exists a need for the process to validate the cached data and ensure the cached data is up to date prior to being referenced by the process. The current methods available for validating cached data are generally inefficient, complex and, in some cases, unreliable.

In typical prior art systems, a process will open a data file, record the modification time of the data file (i.e., the time of the last update to the data file), read and cache the data file in advance. To validate the cached data, the process needs to retrieve the status of the data file and compare the current file modification time of the data file with the recorded file modification time of the cached data. This need for validation each time before the cached data is referenced has a significant negative performance impact on the process. Furthermore, if the file is seldom changed, validating the cached data becomes a waste of resources and could defeat the purpose of caching in the first place. However, if the process chooses not to validate the cached data every time the cached data is referenced, the integrity of the cached data may be compromised.

One method found in the prior art attempts to facilitate data validation by using counters. This method maintains counters in a file or shared memory of a computer for faster validation. These counters are updated by a process each time the process makes changes to the file. The counters are then referenced by another process to determine whether its cached data is up to date. This method, however, requires the processes to know which file or segment of shared memory the counters reside, how to access the counters and how to set the counters. Each process using the counters, i.e., related processes, must be designed to work together on the computer system. Furthermore, this method does not work for any unrelated processes, i.e., processes not designed to use the counters. A related process using this method would not know whether an unrelated process modified a particular file, and vice-versa. Thus, this method of using counters is considered somewhat unreliable.

Accordingly, a need exists for an efficient, simple and reliable method and apparatus for notifying processes within a computer system of file changes.

SUMMARY OF THE INVENTION

The present invention is a method and apparatus for performing tasks associated with file change notifications in a computer system in an efficient and reliable manner. The method of the present invention enables notification to a process of modifications to selected files of interest and comprises the steps of: specifying file modification events to a kernel in the computer system for the selected files of interest; determining in the kernel whether a condition was satisfied; and transmitting a signal indicative of an occurrence of a file modification event being specified by the kernel. The file modification event is a condition which when satisfied prompts the kernel to transmit to the process a signal indicative of the occurrence of a file modification. The condition is satisfied upon modification to the selected file of interest.

Advantageously, the present invention comprises the additional step of responding to the signal transmitted by the kernel and retrieving names of modified files of interest to a buffer.

Furthermore, the present invention determines whether each name of the modified files of interest has been retrieved. If each name has not been retrieved, then a flag having a predetermined first value is specified by the kernel to indicate more names need to be retrieved.

The present invention includes an apparatus for notifying a process in a computer system of modifications to selected files of interest. The apparatus comprises: means for specifying file modification events to a kernel in the computer system for the selected files of interest; and means for transmitting a signal indicative of occurrence of a file modification event by the kernel to the process. The means for transmitting the signal indicative of occurrence of the file modification event is responsive to an occurrence of a file modification event. The apparatus of the present invention further includes means for the process to receive the signal indicative of occurrence of the file modification event, means for retrieving names of modified files of interest, and means for determining whether each name of the modified files of interest has been retrieved.

These and other features, aspects, and advantages of the present invention will become better understood with regard to the following description, appended claims, and accompanying drawings.

BRIEF DESCRIPTION OF THE DRAWINGS

FIG. 2 depicts a flowchart illustrating the relevant part of a program which implements the present invention to set file modification events on files of interest;

DETAILED DESCRIPTION

Figure 1:
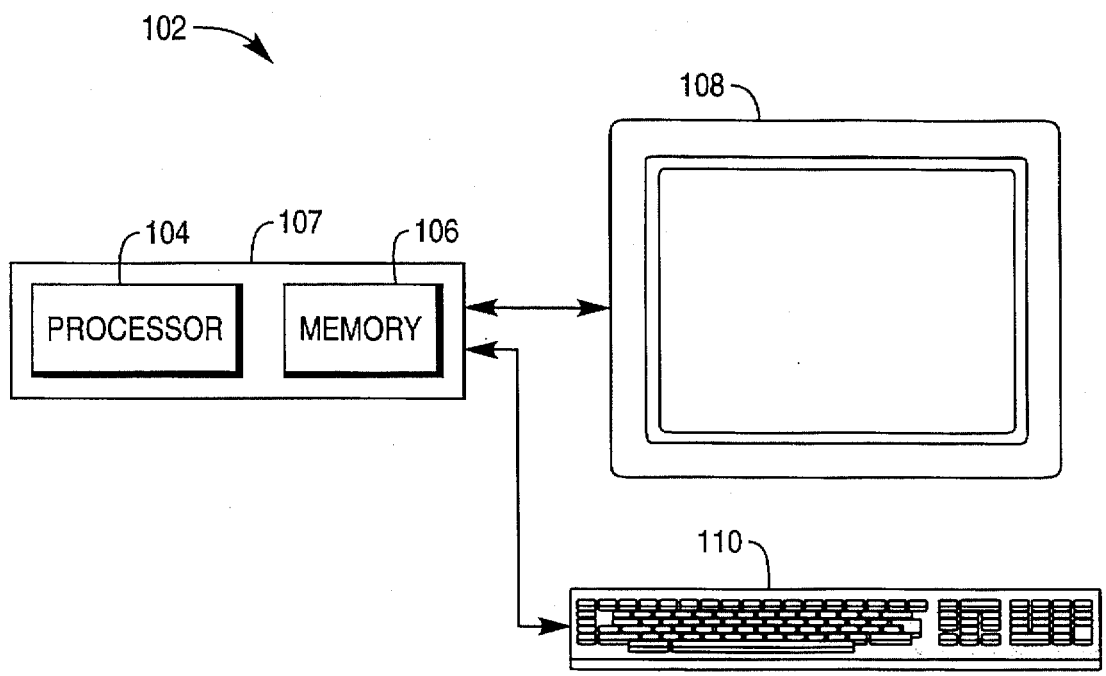
FIG. 1 depicts a file change notification system of the present invention.

As shown in FIG. 1, there is illustrated an exemplary embodiment of a computer system 102 in which the present invention may be comprised. The computer system 102 includes a computing unit 107, a display or video display terminal 108 and an input device 110, such as a keyboard. The computer unit 107 further includes a processor 104 and a memory 106 among other components. The display 108 and input device 110 are electrically coupled to the computer unit 107. The computer system 102 may be a workstation coupled to a central computer system, not shown, in a multi-tasking, multi-user environment, such as a local area network or client-server configuration.

The computer unit 107, display 108 and input device 110 are collectively known as hardware, wherein the hardware is adapted to operate utilizing various software. Software comprises instructions that tell the computer the manner in which to accomplish hardware operations which result in useful work. Necessary for operating the computer system 102 is a type of software called an operating system. Included in the operating system is a kernel. The kernel automatically loads into the memory 106 when the computer system 102 is booted or powered on. The kernel remains resident in the memory 106 during the entire booted duration of the computer system 102. The kernel is essentially a resident control program which manages each facet of the hardware operation and access to all disk files and devices. For example, the kernel manages the task of stopping and starting various processes, i.e., running programs, on the system and notifying these processes of the occurrence of specific events. The manner in which the kernel performs its functions is well known in the art.

Processes communicate with the hardware by using the kernel as an intermediary. When a process needs to perform an operation with the hardware, such as create a file, write to a printer, etc., the program uses system calls to have the kernel take the appropriate action on the hardware. A system call provides a manner for the process to communicate with the kernel. System calls either perform the requested operation or call upon some other portion of the kernel to perform the requested operation.

The present invention introduces a system call for notifying processes when one or more files of interest have been modified by another process. Advantageously, using system calls to indicate file modifications is efficient and reliable. Validation is not required each time before cached data is referenced. Additionally, there is no need to maintain counters which only apply to related processes, i.e., processes cooperating to maintain counters, and not unrelated processes. Furthermore, the present invention works with any process in the computer system, i.e., both related and unrelated processes.

For illustration purposes, the method and apparatus of the present invention will be described with respect to the UNIX® operating system. However, it will be understood that the methodology described is equally applicable to other operating systems that utilizes system calls or a functional equivalent thereof.

The system call of the present invention is referred to herein as "fnotify()." The command syntax related thereto is:

int fnotify(char *path,int *flag)

where "*path" indicates a pathname of a file of interest or a buffer to which a pathname can be returned by the kernel, and "*flag" is a pointer to flags indicating a task for the kernel to undertake. The fnotify() system call is operative to perform three tasks, herein referred as fnotify() tasks. The fnotify() tasks include: (1) SET_NOTIFY; (2) GET_NOTIFY; and (3) MORE_NOTIFY. Each fnotify() task has associated a flag having either a predetermined first or second value. The value of the flag indicates to the kernel, when used in conjunction with the fnotify() system call, the appropriate fnotify() task to be performed.

Figure 1A:
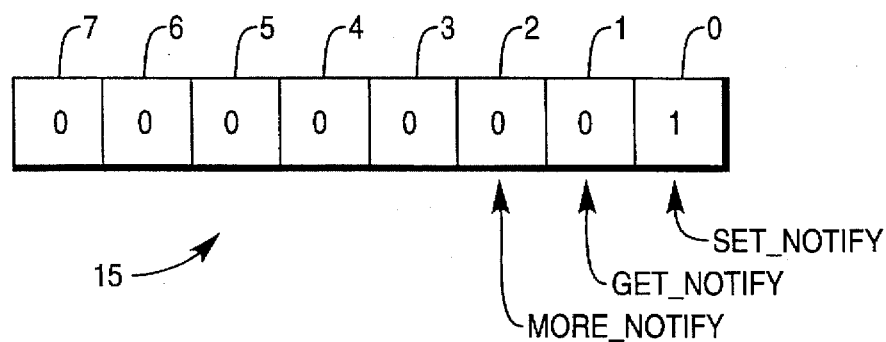
FIG. 1a depicts the manner in which the present invention utilizes the three least significant bits of a byte to store flags indicating a fnotify() task for a kernel to undertake.

As mentioned earlier, "*flag" is a pointer to flags indicating a fnotify() task for the kernel to undertake. The preferred embodiment of the present invention utilizes the three least significant bits of a byte in a predetermined memory location to store the values of the flags. As shown in FIG. 1a, a byte 15 in the a predetermined memory location having eight bits stores the values of the flags for SET_NOTIFY, GET_NOTIFY and MORE_NOTIFY in the least significant bit 0, second least significant bit 1, and third least significant bit 2, respectively. The value stored within these bits are either "0" or "1", indicating whether the corresponding flag is "off" or "on," respectively. For example, if "*flag" points to the byte shown in FIG. 1a, then a fnotify() system call referencing that byte will perform the fnotify() task known as SET_NOTIFY.

When the flag corresponding to the SET_NOTIFY task is turned "on" by the calling process, i.e., process requesting notification of the occurrence of any file modification event, the kernel is put on notice that the calling process wants to be informed when a file of interest is modified. Specifically, the SET_NOTIFY task instructs the kernel to generate a system interrupt signal, which can be caught by the calling process, upon satisfaction of a specified condition on a selected file of interest. The condition specified is referred herein as a file modification event. The condition is satisfied when there is a modification to a selected file of interest. Satisfaction of the condition is also referred herein as an occurrence of a file modification event. The manner in which the kernel tracks activities to files and generates system interrupt signals is well known in the art.

Figure 4:
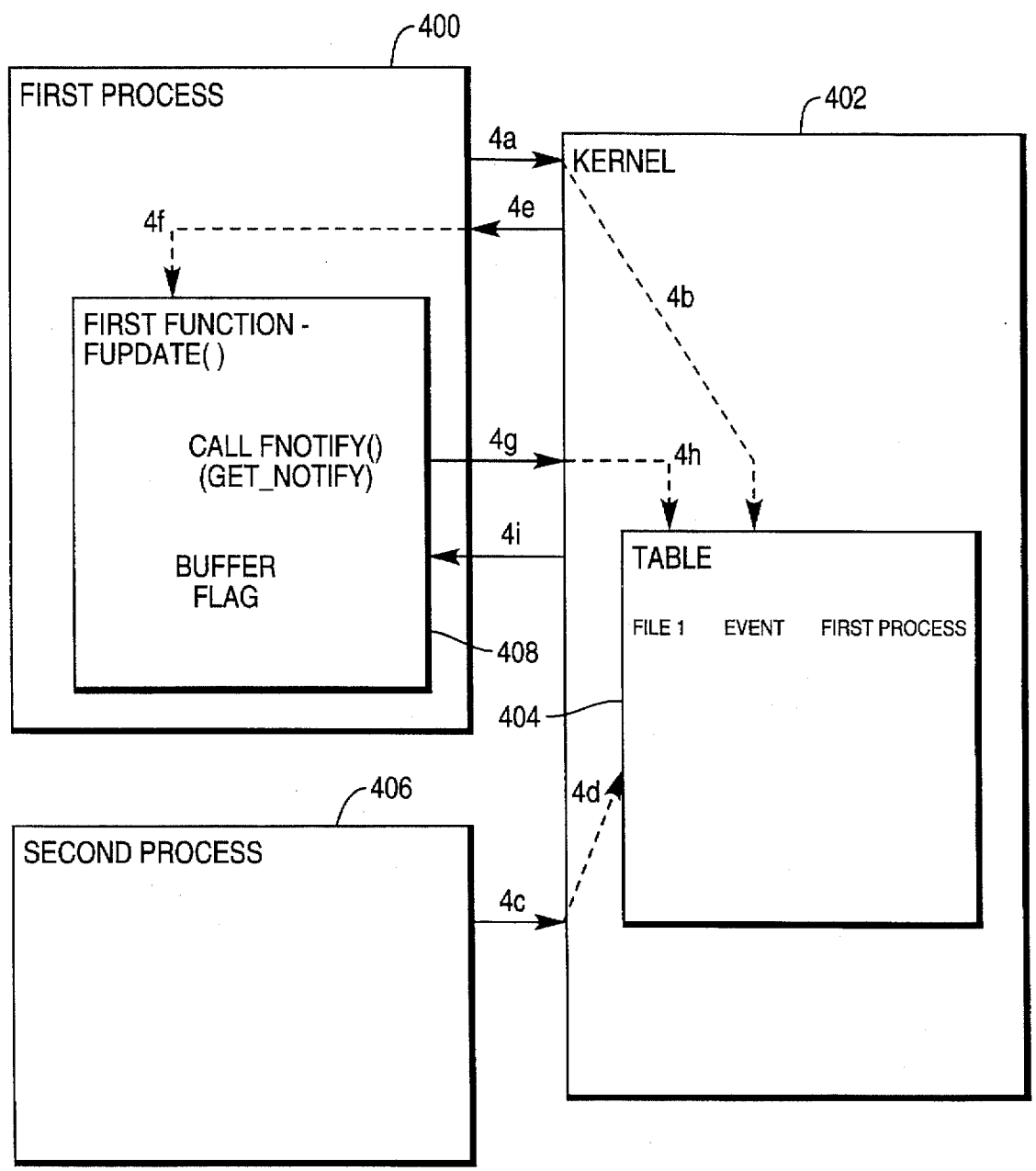
FIG. 4 depicts an exemplary illustration of the interaction between the calling process and the kernel with respect to the present invention.

FIG. 4 depicts an exemplary illustration of the interaction between a first process 400 and a kernel 402 with respect to the present invention. Steps 4a–e illustrate the SET_NOTIFY task. The first process 400 uses the SET_NOTIFY task to notify the kernel 402 in step 4a to inform the first process 400 of a modification to a first file referred to as "file1." In step 4b, the kernel 402 notes the first process 400's request as a file modification event next to file1 in a table 404 maintained by the kernel 402 for tracking file activities. The name of the calling process, i.e., the first process 400, is also noted in the table 404 next to file1, which indicates to the kernel 402 where to transmit the system interrupt signal. A second process 406 modifies file1 in step 4c. In step 4d, the kernel checks the table to determine whether the kernel should take any action as a result of the second process 406's modification to file1. Upon identifying the file modification event next to file1, the kernel generates a system interrupt signal to the calling first process 400 in step 4e.

The preferred embodiment of the present invention utilizes a new system interrupt signal referred to as SIGFILE which can be caught by the calling process to notify the calling process that a file of interest was modified. The calling process uses a well known UNIX system call called signal() to catch the SIGFILE signal and to prescribe the next course of action. In one exemplary embodiment of the present invention, upon receiving the SIGFILE signal, a function referred to as "fupdate" is executed to retrieve the pathnames of the modified files of interest. The fupdate function utilizes the GET_NOTIFY and MORE_NOTIFY tasks of the fnotify() system call to retrieve the pathnames of the modified files of interest, as will be explained herein. The GET_NOTIFY task retrieves the pathname of a file of interest whose modification caused the SIGFILE signal to be generated by the kernel. Specifically, the GET_NOTIFY task instructs the kernel to perform the following: retrieve a pathname of a modified file of interest and place the pathname in a predetermined buffer; determine whether the pathname of each modified file of interest has been retrieved; and specify the value of the flag corresponding to the MORE_NOTIFY task "on" or "off." Successful completion of the fnotify() tasks associated with the SET_NOTIFY and GET_NOTIFY tasks returns a predetermined value to the calling process. Unsuccessful completion of the fnotify() tasks returns an appropriate error code which can be interpreted and acted upon accordingly by the calling process. Note that prior to using the GET_NOTIFY task, a buffer must first be created by the process for the kernel to return the pathname. Generally, the buffer is created by declaring an array of type character. In another embodiment of the invention, the GET_NOTIFY task can also instruct the kernel to create the buffer.

Referring back to FIG. 4, steps 4f–i illustrate the steps taken in carrying out the GET_NOTIFY task. In step 4f, the first process 400 executes a first function 408, i.e., fupdate() function, (within the first process 400) upon receiving the SIGFILE signal to retrieve the pathnames of the modified files of interest. The first function 408 uses the GET_NOTIFY task to instruct the kernel 402 in step 4g to return a pathname of the modified file of interest to a predetermined buffer. The kernel 402 references the table 404 in step 4h and retrieves the pathname to the predetermined buffer in step 4i. Also, in step 4h, the kernel 402 examines the table 404 to determine whether there are more pathnames of modified files of interest which have not been retrieved. If there are more pathnames to return, the kernel 402 also turns "on" the flag corresponding to the MORE_NOTIFY task in step 4i. Otherwise the kernel 402 turns "off" the flag corresponding to the MORE_NOTIFY task in step 4i.

The value of the flag corresponding to the MORE_NOTIFY task indicates to the calling process that there exist at least one more pathname of a modified file of interest that has not been retrieved by the calling process. Note that the kernel (not the calling process) determines the value of the flag corresponding to the MORE_NOTIFY task. The presence of an "on" flag corresponding to the MORE_NOTIFY task is provided for the kernel to notify the calling process to retrieve the remaining pathnames.

Figure 3:
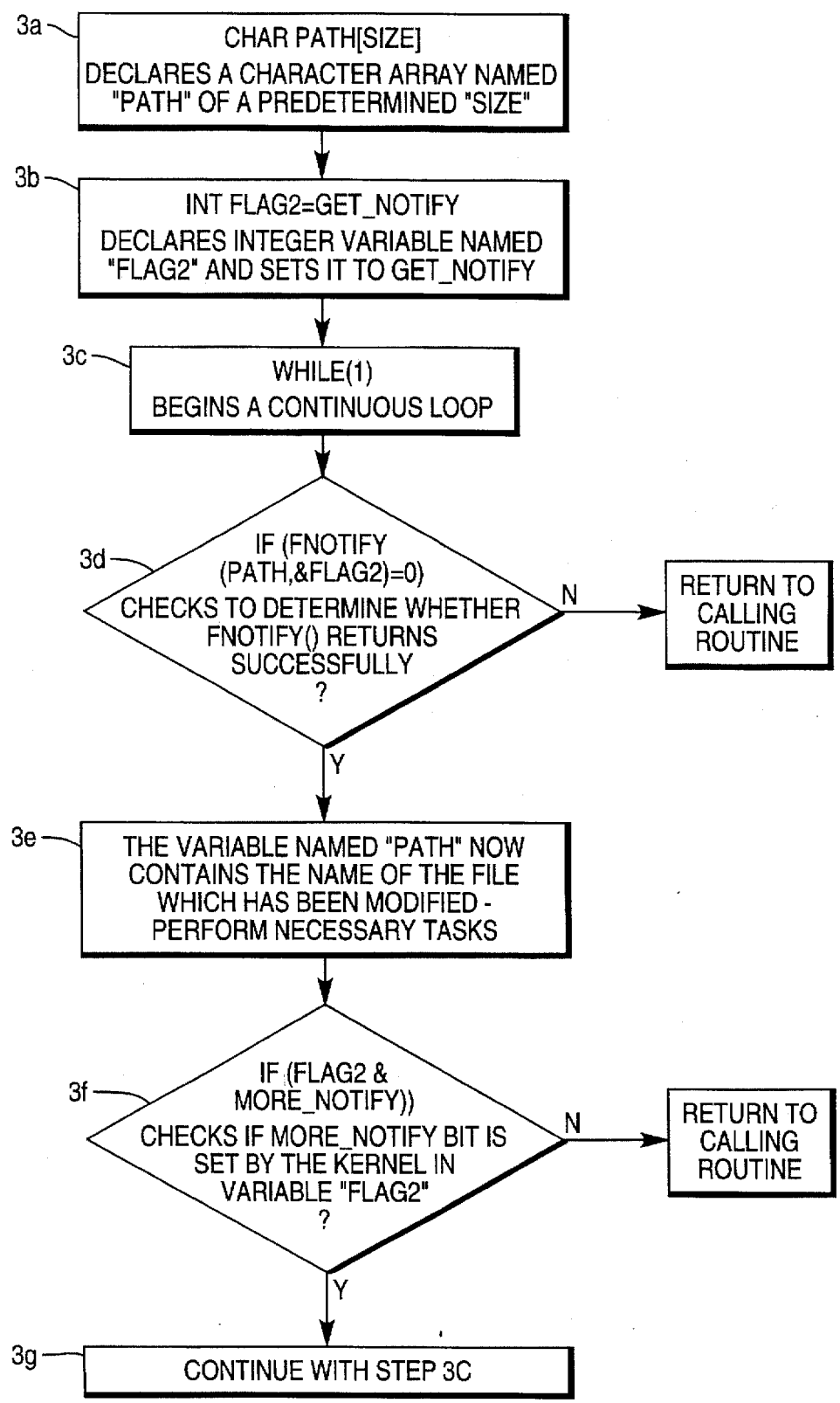
FIG. 3 depicts a flowchart illustrating an exemplary function utilized by the program depicted in FIG. 2 to retrieve the names of files of interest which were modified.

FIG. 2 shows pseudo code for the relevant parts of a program implementing the present invention to set file modification events on files of interest. As shown in FIG. 2, steps 2a–e notify the kernel which files are of interest to the process. Step 2a uses a header file provided by the system to define values for the three fnotify() tasks: SET_NOTIFY, GET_NOTIFY, and MORE_NOTIFY. Step 2b then declares an integer variable named "flag1" and turns "on" the flag corresponding to the SET_NOTIFY task, i.e., second least significant bit, which was defined in step 2a. Step 2c instructs the program as to the manner in which to handle a new SIGFILE signal, which should be supported by the system. Here, if a SIGFILE signal is caught by the program anytime while the process is running, a function referred to as fupdate will be executed. An exemplary fupdate function is illustrated in FIG. 3 to retrieve the names of the modified files of interest.

Step 2d proceeds to use the SET_NOTIFY task to specify file modification events. Step 2d instructs the kernel to perform the fnotify() task associated with the flag located at the address of the variable "flag1" which, in this case, is SET_NOTIFY. Specifically, the kernel is instructed to specify a file modification event on the file with the pathname "/tmp/file1." Similarly, step 2e instructs the kernel to specify a file modification event on the file with the pathname "/tmp/file2."

If "/tmp/file1" and/or "/tmp/file2" are modified by another process, the kernel will immediately notify the calling process by sending a SIGFILE signal to the process. The SIGFILE signal is caught by the signal() system call in step 2c and the fupdate function shown in FIG. 3 is executed to retrieve the pathnames of the modified files of interest.

The fupdate function uses a loop to retrieve all the pathnames of the modified files of interest. However, before the loop can be executed, some initialization is necessary. The fupdate function declares "path" to be a character array of a predetermined "size" in step 3a. This creates a buffer to which the kernel can return the pathnames of modified files of interest. Step 3b declares an integer variable named "flag2" and turns "on" the flag corresponding to the GET_NOTIFY task. Step 3c begins a continuous loop to retrieve the names of files of interest which were modified.

In step 3d, the fupdate function instructs the kernel to execute the fnotify() task associated with the flag located at the address of the variable "flag2," i.e., GET_NOTIFY task. Specifically, the kernel gets a pathname of a modified file of interest and places the pathname into the character array "path." The kernel then determines whether any more files of interest were modified. If there are none, the kernel turns "off" the flag corresponding to the MORE_NOTIFY task at the address for variable "flag2." Otherwise the kernel turns "on" the flag corresponding to the MORE_NOTIFY task at the address for variable "flag2." If the GET_NOTIFY task is successfully completed by the kernel, a value of "0" is returned satisfying the condition set forth in step 3d. The fupdate function subsequently continues to step 3e. Unsuccessful completion of the GET_NOTIFY task will cause the fupdate function to break and return to the calling routine with an appropriate error message which the calling process may act upon accordingly.

Once the pathname of the file of interest is retrieved and placed in the buffer "path" by the kernel in step 3d, it is up to the programmer in step 3e to decide the next course of action before the fupdate function retrieves the next pathname of another modified file of interest. Step 3e would typically be a set of instructions directing the process to update its cached data.

Note that in the flow diagram of FIG. 3 only one pathname of a modified file of interest has been retrieved. To retrieve the pathnames of the other modified files of interest, if any, step 3d must be re-executed. If there are no other modified files of interest, then the fupdate function must terminate itself and return to the calling routine of FIG. 2. Step 3f sets a condition for the loop to terminate. If the flag corresponding to the MORE_NOTIFY task is turned "on" by the kernel in step 3d, then the loop continues. Specifically, the condition in step 3f requires the integer variable labeled "flag2" to have the flag corresponding to the MORE_NOTIFY task turned "on." If there are no more pathnames to retrieve, this loop is terminated and control is returned to the calling routine.

In another embodiment of the present invention, every pathname of the modified files of interest may be returned by the kernel all at once to one or more predetermined buffers, thus avoiding the need for the loop and the MORE_NOTIFY task.

Advantageously, the present invention permits processes to open and read a file, cache the data, and continuously use the data until it is notified that the file has been modified. This has the effect of granting a process the exclusive access right of a file. The process no longer has to check the status of the file prior to referencing the cached data. The present invention reduces the number of system calls, such as well known UNIX system calls read() and stat(), used by a process when accessing a file. As a result, the performance of the process can be significantly improved.

Although the present invention has been described in considerable detail with reference to a certain preferred operating system, other operating systems are also applicable. Therefore, the spirit and scope of the appended claims should not be limited to the description of the preferred operating system contained herein.

I claim:

1. A method for notifying a process in a computer system of modifications to selected files of interest comprising the steps of:

specifying by means of a system call instruction file modification events to a kernel of an operating system in said computer system for said selected files of interest, said file modification event being a condition which when satisfied prompts said kernel to transmit to said process a signal indicative of occurrence of said file modification event, said condition being satisfied upon modification to said selected file of interest:

determining in said kernel whether said condition has been satisfied; and transmitting said signal from said kernel indicative of occurrence of said file modification event being specified.

wherein said system call instruction is operative to set a flag in said kernel which prompts the kernel to transmit said signal upon occurrence of said file modification event.

2. The method recited in claim 1 comprising the additional steps of:

receiving said signal at said process indicative of occurrence of said file modification event being specified; and executing a function at said process responsive to said signal received at said process indicative of occurrence of said file modification event being specified, wherein said function retrieves names of modified files of interest.

3. The method recited in claim 2 wherein the step of executing said function includes the steps of:

creating a buffer for storing said names of said modified files of interest;

retrieving said names of said modified files of interest; and storing said names of said modified files of interest being retrieved in said buffer.

4. A method for notifying a process in a computer system of modifications to selected files of interest comprising the steps of:

specifying file modification events to a kernel of an operating system in said computer system for said selected files of interest, said file modification event being a condition which when satisfied prompts said kernel to transmit to said process a signal indicative of occurrence of said file modification event, said condition being satisfied upon modification to said selected file of interest:

determining in said kernel whether said condition has been satisfied, transmitting said signal from said kernel indicative of occurrence of said file modification event being specified;

receiving said signal at said process indicative of occurrence of said file modification event being specified:

creating a buffer for storing names of modified files of interest; and executing a function at said process responsive to said signal received at said process, wherein said function retrieves said names of said modified files of interest, said function includes the steps of, retrieving a name of a modified file of interest, storing said name of said modified file of interest being retrieved in said buffer, and determining at said kernel whether each said name of said modified files of interest has been retrieved.

5. The method recited in claim 4 wherein said kernel specifies a flag having a first predetermined value if each said name of said modified files of interest has not been retrieved.

6. The method recited in claim 5 wherein said kernel specifies said flag having a second predetermined value if each said name of said modified file of interest has been retrieved.

7. The method recited in claim 6 wherein the step of executing said function includes the additional step of:

determining at said function whether said flag has said first predetermined value.

8. The method recited in claim 7 wherein the step of executing said function to retrieve said names of said modified files of interest is repeated if said flag has said first predetermined value.

9. A method for retrieving names of modified files of interest for a process in a computer system, said process responsive to a signal transmitted by a kernel in said computer system, wherein said signal is indicative of occurrence of a file modification event to a selected file of interest, said file modification event being a condition whereupon satisfaction of said condition prompts said kernel to transmit to said process said signal indicative of occurrence of said file modification event, said condition satisfied upon modification to said selected file of interest, said method for retrieving said names of said modified files of interest comprising the steps of:

creating a buffer for storing said names of said modified files of interest; and executing a function at said process responsive to said signal received at said process, wherein said function retrieves said names of said modified files of interest, said function includes the steps of, retrieving a name of a modified file of interest, and storing said name of said modified file of interest being retrieved in said buffer.

10. The method recited in claim 9 wherein the step of executing said function includes the additional step of:

determining at said kernel whether each said name of said modified files of interest has been retrieved.

11. The method recited in claim 10 wherein said kernel specifies a flag having a first predetermined value if each said name of said modified files of interest has not been retrieved.

12. The method recited in claim 11 wherein said kernel specifies said flag having a second predetermined value if each said name of said modified files of interest has been retrieved.

13. The method recited in claim 12 wherein the step of executing said function includes the additional step of:

determining at said function whether said flag has said first predetermined value.

14. The method recited in claim 13 wherein the step of executing said function to retrieve said names of said modified files of interest is repeated if said flag has said first predetermined value.

15. An apparatus for notifying a process in a computer system of modifications to selected files of interest comprising:

means for specifying by means of a system call instruction file modification events to a kernel in said computer system for said selected files of interest, wherein said file modification event is a condition whereupon satisfaction of said condition prompts said kernel to transmit to said process a signal indicative of occurrence of said file modification event, said condition being satisfied upon modification to said selected file of interest;

means for transmitting said signal indicative of occurrence of said file modification event by said kernel to said process, wherein said means for transmitting said signal is responsive to satisfaction of said condition:

means for said process to receive said signal indicative of occurrence of said file modification event: and means for said process to retrieve names of modified files of interest, wherein said means, for said process to retrieve said names of said modified files of interest includes means for creating a buffer for storing said names of said modified files of interest and means for storing said names of said modified files of interest being retrieved in said buffer.

16. The apparatus recited in claim 15 wherein said means for retrieving said names of said modified files of interest include:

means for determining whether each said name of said modified files of interest has been retrieved.

17. The apparatus recited in claim 16 further comprising:

means for specifying a flag having a first predetermined value responsive to said means for determining whether each said name of said modified files of interest has been retrieved.

18. An apparatus for notifying a process in a computer system of modifications to selected files of interest comprising:

means for specifying by means of a system call instruction file modification events to a kernel in said computer system for said selected files of interest, wherein said file modification event is a condition whereupon satisfaction of said condition prompts said kernel to transmit to said process a signal indicative of occurrence of said file modification event, said condition being satisfied upon modification to said selected file of interest: and means for transmitting said signal indicative of occurrence of said file modification event by said kernel to said process, wherein said means for transmitting said signal is responsive to satisfaction of said condition, wherein said system call instruction is operative to set a flag in said kernel which prompts the kernel to transmit said signal upon occurrence of said file modification event.

19. An apparatus for notifying a process in a computer system of modifications to selected files of interest comprising:

means for specifying by means of a system call instruction file modification events to a kernel in said computer system for said selected files of interest, wherein said file modification event is a condition whereupon satisfaction of said condition prompts said kernel to transmit to said process a signal indicative of occurrence of said file modification event, said condition being satisfied upon modification to said selected file of interest: and means for transmitting said signal indicative of occurrence of said file modification event by said kernel to said process, wherein said means for transmitting said signal is responsive to satisfaction of said condition, wherein said system call instruction is of the general form: int fnotify(char*path,int*flag) where "*path" indicates a location to which a pathname can be returned by the kernel, and "*flag" is a pointer to flags indicating a task for the kernel to undertake.

20. A method for notifying a process in a computer system of modifications to selected files of interest comprising the steps of:

specifying by means of a system call instruction file modification events to a kernel of an operating system in said computer system for said selected files of interest, said file modification event being a condition which when satisfied prompts said kernel to transmit to said process a signal indicative of occurrence of said file modification event, said condition being satisfied upon modification to said selected file of interest:

determining in said kernel whether said condition has been satisfied: and transmitting said signal from said kernel indicative of occurrence of said file modification event being specified, wherein said system call instruction is of the general form: int fnotify(char*path,int*flag) where "*path" indicates a location to which a pathname can be returned by the kernel, and "*flag" is a pointer to flags indicating a task for the kernel to undertake.

* * * * *